(12) United States Patent
Hirayama et al.

(10) Patent No.: US 10,787,193 B2
(45) Date of Patent: Sep. 29, 2020

(54) DRIVE CONTROL DEVICE AND CONTROL METHOD FOR ELECTRIC MOTOR

(71) Applicant: Hitachi Automotive Systems, Ltd., Hitachinaka-shi, Ibaraki (JP)

(72) Inventors: Hiroshi Hirayama, Hitachinaka (JP); Yoshitaka Abe, Hitachinaka (JP); Tomonobu Koseki, Hitachinaka (JP); Mitsuhiko Watanabe, Hitachinaka (JP); Atsushi Arata, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 3 days.

(21) Appl. No.: 16/306,734

(22) PCT Filed: Jun. 9, 2017

(86) PCT No.: PCT/JP2017/021471
§ 371 (c)(1),
(2) Date: Dec. 3, 2018

(87) PCT Pub. No.: WO2018/003462
PCT Pub. Date: Jan. 4, 2018

(65) Prior Publication Data
US 2019/0300046 A1    Oct. 3, 2019

(30) Foreign Application Priority Data

Jul. 1, 2016  (JP) .................................. 2016-131724

(51) Int. Cl.
*H01M 10/48* (2006.01)
*B62D 5/04* (2006.01)
(Continued)

(52) U.S. Cl.
CPC ........... *B62D 5/0406* (2013.01); *B62D 5/046* (2013.01); *H02P 6/14* (2013.01); *H02P 25/16* (2013.01)

(58) Field of Classification Search
CPC ....... B62D 5/0406; B62D 5/046; H02P 25/16; H02P 6/14
See application file for complete search history.

(56) References Cited

U.S. PATENT DOCUMENTS

2012/0293097 A1   11/2012 Tachibana et al.
2013/0038891 A1   2/2013  Nakagawa
(Continued)

FOREIGN PATENT DOCUMENTS

JP    8-98506 A      4/1996
JP    08-098506    * 12/1996
(Continued)

OTHER PUBLICATIONS

Power Converter (Pub #:JP08-098506), Takashi et al, Hitachi Ltd. (Year: 1996).*
(Continued)

*Primary Examiner* — Muhammad S Islam
(74) *Attorney, Agent, or Firm* — Crowell & Moring LLP (57) ABSTRACT

Provided is a drive control device for an electric motor in which the number of terminals and the number of wires can be reduced. The drive control device includes: an inverter circuit that drives an electric motor having a plurality of phases; a drive circuit including drivers; a control circuit that outputs a control signal to control the drive circuit; and a signal line that connects the control circuit to the drive circuit to transmits a control signal from the control circuit to the drive circuit, in which the number of signal lines is fewer than the number of the phases of the electric motor.

7 Claims, 9 Drawing Sheets

(51) Int. Cl.
*H02P 6/14* (2016.01)
*H02P 25/16* (2006.01)

(56) References Cited

U.S. PATENT DOCUMENTS

| | | | |
|---|---|---|---|
| 2014/0009094 A1 | 1/2014 | Yamamoto | |
| 2014/0062361 A1* | 3/2014 | Suzuki | H02M 7/5387 318/400.17 |
| 2016/0301112 A1* | 10/2016 | Yamazoe | G01R 31/371 |
| 2018/0083565 A1* | 3/2018 | Saha | H02P 27/085 |

FOREIGN PATENT DOCUMENTS

| | | | |
|---|---|---|---|
| JP | 11-178349 | * | 4/1997 |
| JP | 11-178349 A | | 7/1999 |
| JP | 2012-244793 A | | 12/2012 |
| JP | 2013-38606 A | | 2/2013 |
| JP | 5590077 B2 | | 9/2014 |

OTHER PUBLICATIONS

Pulse Width Modulation Control Device (Pub. #: JP11-178349), Shimada Yasuo, Toshiba Corp. (Year: 1997).*
International Search Report (PCT/ISA/210) issued in PCT Application No. PCT/JP2017/021471 dated Sep. 12, 2017 with English translation (five (5) pages).
Japanese-language Written Opinion (PCT/ISA/237) issued in PCT Application No. PCT/JP2017/021471 dated Sep. 12, 2017 (four (4) pages).

* cited by examiner

| INVERTER U CONTROL PATTERN | INVERTER V CONTROL PATTERN | INVERTER W CONTROL PATTERN | ELECTRIC MOTOR M CONTROL PATTERN |
|---|---|---|---|
| 3 | 3 | 3 | 27 |

DRIVE CONTROL DEVICE AND CONTROL METHOD FOR ELECTRIC MOTOR

TECHNICAL FIELD

The present invention relates to a drive control device and a control method for an electric motor.

BACKGROUND ART

It is demanded to miniaturize a drive control device for an electric motor in an electric power steering control device or the like due to constraints in an installation space. To miniaturize such a drive control device for an electric motor, for example, it is conceivable to reduce a physical frame of a control circuit (CPU) and that of a driver IC constituting the device or reduce the area of a substrate on which these components are mounted. On the other hand, since it is necessary to arrange the certain number of terminals and the certain number of wires on the control circuit, the driver IC, and the substrate in order to exchange signals with other constituents, there is a physical limit in miniaturizing the drive control device for an electric motor.

Accordingly, to reduce the number of terminals and the number of wires between the CPU and the driver IC, PTL 1 (JP 5590077 B2) discloses, for example, a rotating electrical machine control device that includes: a power converter having a plurality of switching elements forming plural switching element pairs each of which is formed of a first switching element and a second switching element, the first switching element corresponding to each phase or each terminal of each of a plurality of coils of a rotating electrical machine and arranged on a high potential side of power supply, the second switching element being arranged on a low potential side, and the power converter adapted to convert, by turning on/off each first switching element and each second switching element, power supplied from the power supply to the rotating electrical machine; a plurality of synthesized signal generation units each provided in a manner corresponding to each phase or each terminal of each of the coils, and adapted to generate a synthesized signal by synthesizing a first command signal with a second command signal, the first command signal being adapted to command on/off operation of each first switching element and the second command signal being adapted to command on/off operation of each second switching element; a plurality of CPU output terminals provided in a manner corresponding to the synthesized signal generation units and each adapted to output a synthesized signal generated in each of the synthesized signal generation units; a plurality of IC input terminals provided in a manner corresponding to the CPU output terminals and electrically connected to the corresponding CPU output terminals via a plurality of wires; and a gate signal generation unit that separates a synthesized signal received in each of the IC input terminals to generate a first gate signal that is a signal of each first switching element and a second gate signal that is a gate signal of each second switching element.

CITATION LIST

Patent Literature

PTL 1: JP 5590077 B2

SUMMARY OF INVENTION

Technical Problem

However, in the above-mentioned prior art, in a case of controlling an electric motor (rotating electric machine) having N phases, the number of terminals of a control circuit, the number of drive circuit terminals to drive an electric motor, and the number of wires to connect these terminals are required to be same as the number of the phases (N). Therefore, considering redundancy of a wire to prevent a risk of wire disconnection, short circuit, and the like, the number of terminals and the number of wires are largely increased, and therefore, the related art is not sufficient to miniaturize the drive control device for an electric motor.

The present invention is made in the view of the above-described situation, and directed to providing a drive control device for an electric motor in which miniaturization can be achieved by reducing the number of terminals and the number of wires.

Solution to Problem

To achieve the above-described object, the present invention includes: a drive circuit adapted to drive an electric motor having a plurality of phases; a control circuit adapted to output a control signal to control the drive circuit; and a signal line that connects the control circuit to the drive circuit to transmit a control signal from the control circuit to the drive circuit, the number of the signal lines being fewer than the number of the phases of the electric motor.

Advantageous Effects of Invention

Miniaturization can be achieved by reducing the number of terminals and the number of wires.

DESCRIPTION OF EMBODIMENTS

In the following, embodiments of the present invention will be described with reference to the drawings.

First Embodiment

A first mode of the present invention will be described with reference to FIGS. 1 to 8.

In the present embodiment, a description will be provided by exemplifying an electric power steering device as an application target of a drive control device for an electric motor of the present invention.

Figure 1:
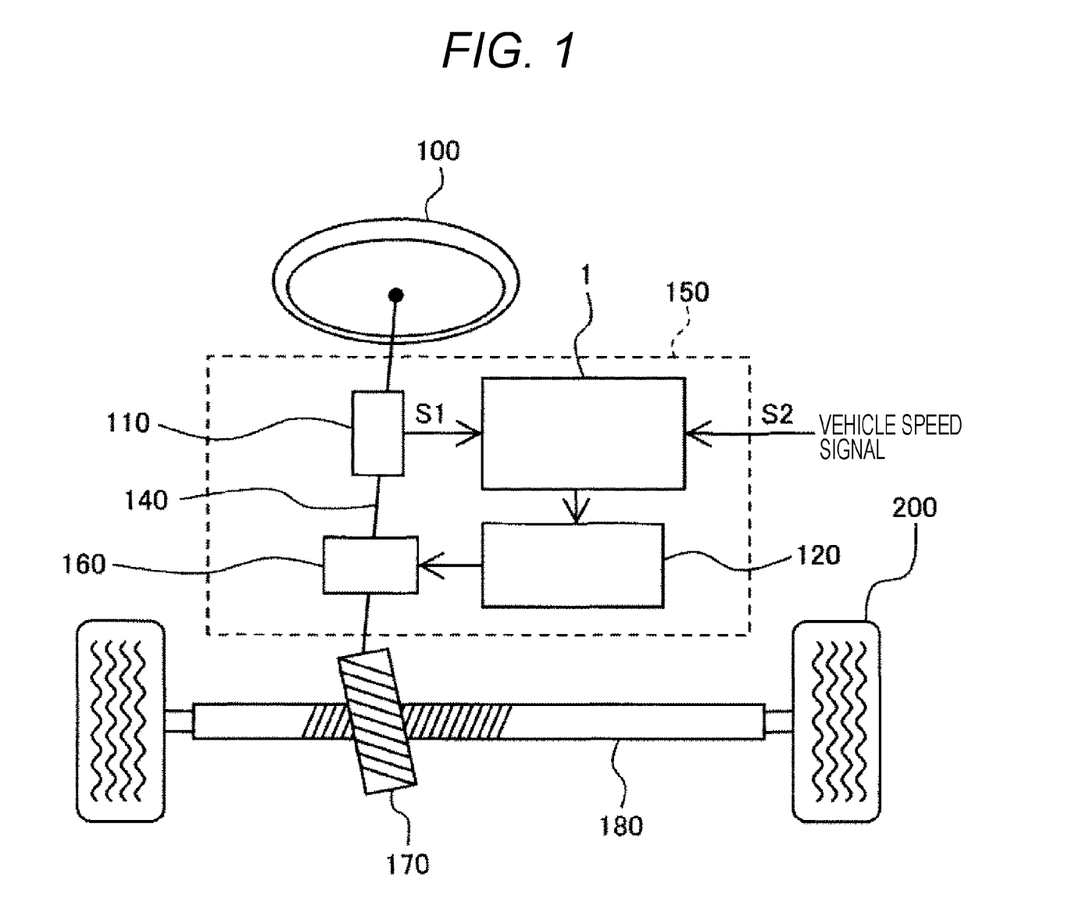
FIG. 1 is a diagram schematically illustrating an electric power steering device together with peripheral constituent, and a drive control device for an electric motor according to a first embodiment is applied in the electric power steering device.

FIG. 1 is a diagram schematically illustrating an electric power steering device together with peripheral constituent, and the drive control device for an electric motor according to the present embodiment is applied in this electric power steering device.

In FIG. 1, in a steering device of an automobile or the like on which an electric power steering device 150 is mounted, when an operator rotationally operates the steering wheel 100, a pinion gear 170 connected to a steering wheel 100 via a steering shaft 140 is rotationally driven, and wheels 200 is steered by linearly driving a rack shaft 180 in an axial direction by rotation of the pinion gear 170.

The electric power steering device 150 is installed in the steering shaft 140 of such a steering device and includes: an electric motor 120 for steering assist; a decelerator 160 that transmits torque of the electric motor 120 to the steering shaft; a steering torque sensor 110 that detects steering torque generated at the steering shaft 140 by operation of the steering wheel 100; and a drive control device 1 that controls operation of the electric motor 120 on the basis of a steering torque detection signal S1 and a vehicle speed signal S2. Thus, steering assist force according to a travel state is generated by driving the electric motor 120 for steering assist.

Figure 2:
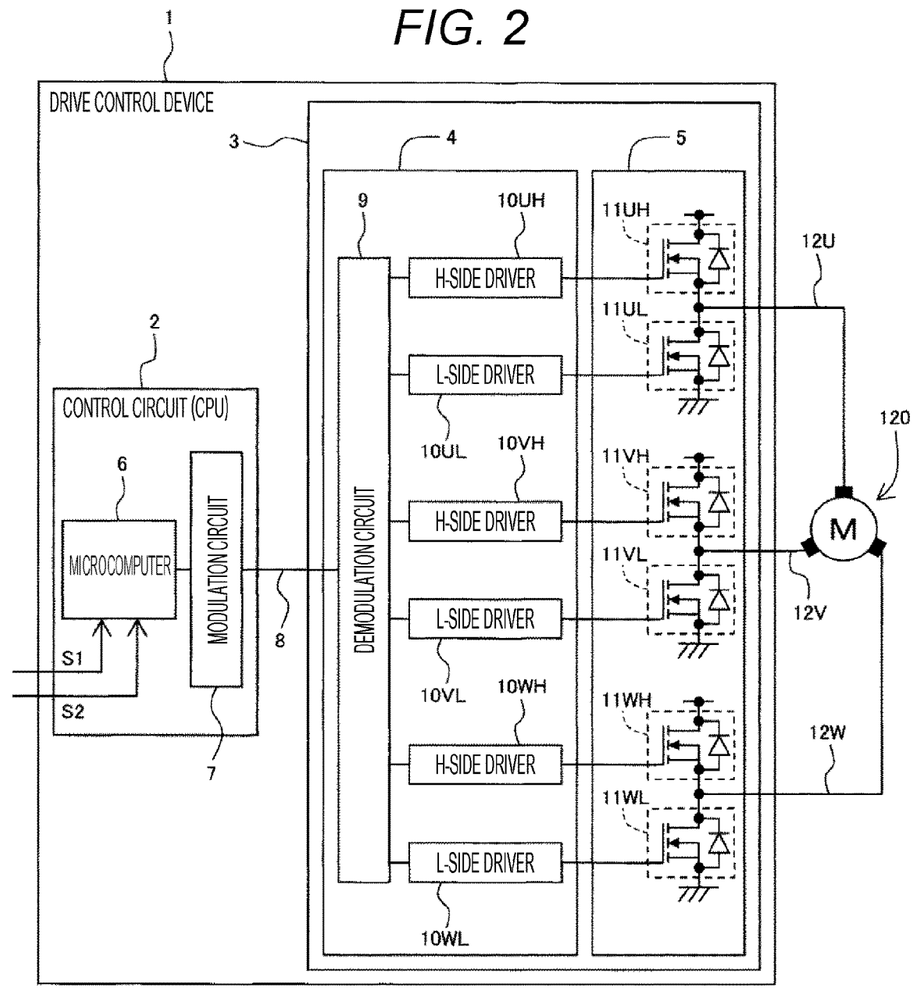
FIG. 2 is a diagram schematically illustrating an entire configuration of a drive control device for an electric motor according to the first embodiment.

FIG. 2 is a diagram schematically illustrating an entire configuration of a drive control device for an electric motor according to the present embodiment.

In FIG. 2, the drive control device 1 includes: a control circuit (CPU) 2 that generates a control signal used to control the electric motor 120 on the basis of the steering torque detection signal S1 and the vehicle speed signal S2; and a drive circuit 3 that drives the electric motor 120 on the basis of the control signal transmitted from the control circuit 2 via a signal line 8. The control circuit 2 and the drive circuit 3 are mounted on a substrate on which the signal line 8 and the like are printed, for example.

The electric motor 120 of the present embodiment is, for example, a three-phase electric motor having three phases of a U phase, a V phase, and a W phase, and the signal line 8 that connects the control circuit 2 to the drive circuit 3 to transmit a control signal from the control circuit 2 to the drive circuit 3 is formed of number of wires (one wire) fewer than the number of the phases (three phases) of the electric motor 120.

The control circuit 2 includes: a microcomputer 6 that generates a control signal used to control the electric motor 120 on the basis of the steering torque detection signal S1 and the vehicle speed signal S2; a modulation circuit 7 that generates a modulation signal by modulating (converting) the control signal generated by the microcomputer 6 and outputs the same to the signal line 8 in a manner superimposed on a carrier wave.

The drive circuit 3 includes: an inverter circuit 5 that drives the electric motor 120 connected via a U-phase wire 12U, a V-phase wire 12V, and a W-phase wire 12W connected to the electric motor 120; and an inverter drive circuit (pre-driver IC) 4 that outputs a drive signal (gate signal) to drive the inverter circuit 5.

The inverter circuit 5 includes H-side switching elements 11UH, 11VH, and 11WH each arranged on a high potential side and L-side switching elements 11UL, 11VL, and 11WL each arranged on a low potential side of power supply in a manner corresponding to the U-phase wire 12U, the V-phase wire 12V, and the W-phase wire 12W of the electric motor 120, respectively.

The inverter drive circuit 4 includes: a demodulation circuit 9 that demodulates (restores) the control signal (modulation signal superimposed on the carrier wave) transmitted via the signal line 8; H-side drivers 10UH, 10VH, and 10VW each of which outputs a drive signal (gate signal) to perform on/off drive (conduction/interruption) for each of the H-side switching elements 11UH, 11VH, and 11WH of the inverter circuit 5 on the basis of the control signal demodulated by the demodulation circuit 9; and L-side drivers 10UL, 10VL, and 10WL each of which outputs a drive signal (gate signal) to perform on/off drive (conduction/interruption) for each of the L-side switching elements 11UL, 11VL, and 11WL on the basis of the demodulated control signal.

Here, as a control method for an electric motor, a control method for the electric motor 120 that is the three-phase electric motor will be described as an example.

Figure 3:
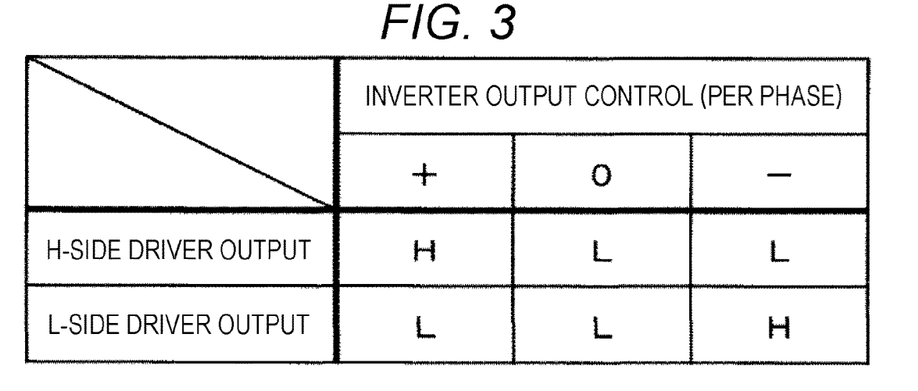
FIG. 3 is a diagram illustrating exemplary combinations of outputs of an inverter circuit and outputs of a pair of drivers.

FIG. 3 is a diagram illustrating exemplary combinations of outputs of the inverter circuit and outputs of a pair of drivers. Additionally, FIG. 4 is a diagram illustrating the number of combinations of control states of the three-phase electric motor.

As illustrated in FIG. 3, in a case of considering, as one pair of drivers, the H-side driver 10UH and the L-side driver 10UL which respectively control the H-side switching element 11UH and the L-side switching element constituting one pair of switching elements to control the U phase of the electric motor 120, the number of combinations of outputs of the H-side driver 10UH and the L-side driver 10UL becomes three in a case of controlling the U phase of the electric motor 120 with three signals (+, 0, and −). Since the exemplified electric motor 120 is the three-phase electric motor, each of the V phase and W phase also have three combinations of outputs of each of the H-side drivers 10VH, 10WH and each of the L-side drivers 10VL, 10WL respectively in a similar manner.

Figure 4:
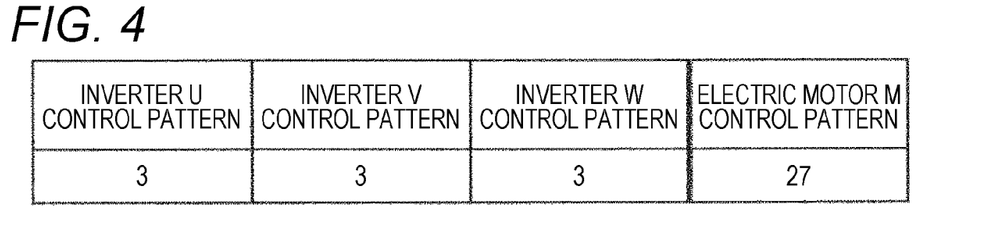
FIG. 4 is a diagram illustrating the number of combinations in a state of controlling a three-phase electric motor.

Therefore, as illustrated in FIG. 4, the number of combinations of the outputs relative to the H-side drivers 10UH, 10VH, 10VW and the L-side drivers 10UL, 10VL, 10WL in all of the three phases becomes 27 considering the theory of independent events. In other words, the number of combinations of control signals received in the H-side drivers 10UH, 10VH, 10VW and the L-side drivers 10UL, 10VL, 10WL in all of the three phases becomes 27. That is, the modulation circuit 7 modulates 27 combinations of control signals and transmits the modulated signals through the number of signal lines 8 (one signal line) fewer than the number of the phases (three phases) of the electric motor 120, and demodulates the same to 27 combinations of control signals in the demodulation circuit 9 and transmits the same to the H-side drivers 10UH, 10VH, 10VW and the L-side drivers 10UL, 10VL, 10WL.

Meanwhile, the number of combinations becomes 25 (=27−2) in a case of considering excluding combinations in which all of the three phases of U phase, V phase, and W phase are in the (+) state (all outputs of the H-side drivers are H and all outputs of the L-side drivers are L) or all of the three phases are in the (−) state (all outputs of the H-side drivers are L and all outputs of the L-side drivers are H), but here, the number of combinations is recited as 27 to simplify the description. Additionally, in a case where the number of the phases of the electric motor that is a control target is other than three phases, the number of H-side drivers and the number of L-side drivers same as the number of the phases of the electric motor are used, and similarly, the number of combinations of control signals becomes the number same as the number of the phases (drivers) of the electric motor.

Figure 5:
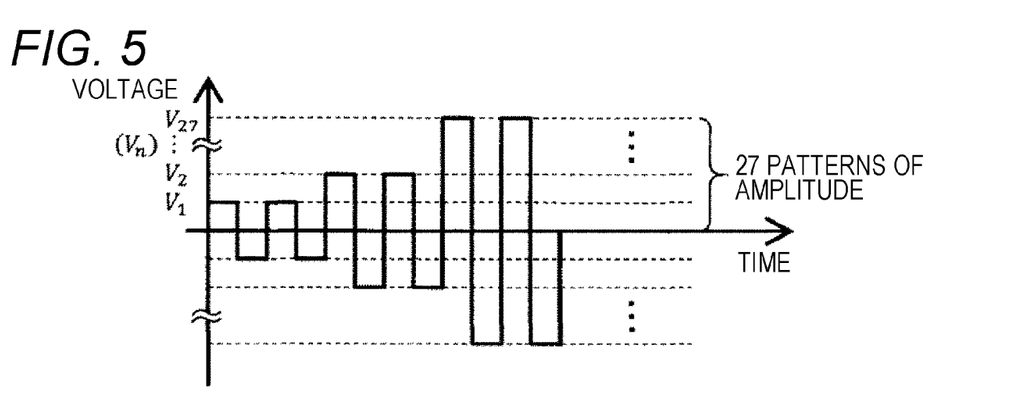
FIG. 5 is a diagram illustrating amplitude modulation as an exemplary modulation method used in a modulation circuit and a demodulation circuit.
Figure 6:
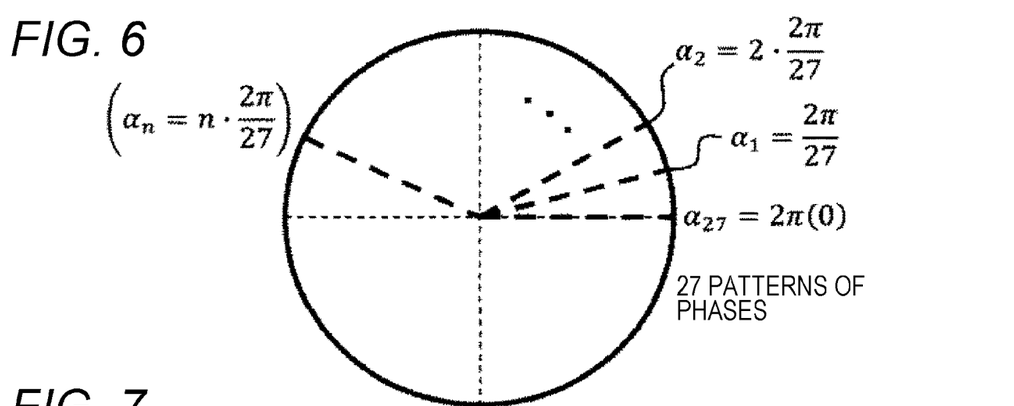
FIG. 6 is a diagram illustrating phase modulation as an exemplary modulation method used in the modulation circuit and the demodulation circuit.
Figure 7:
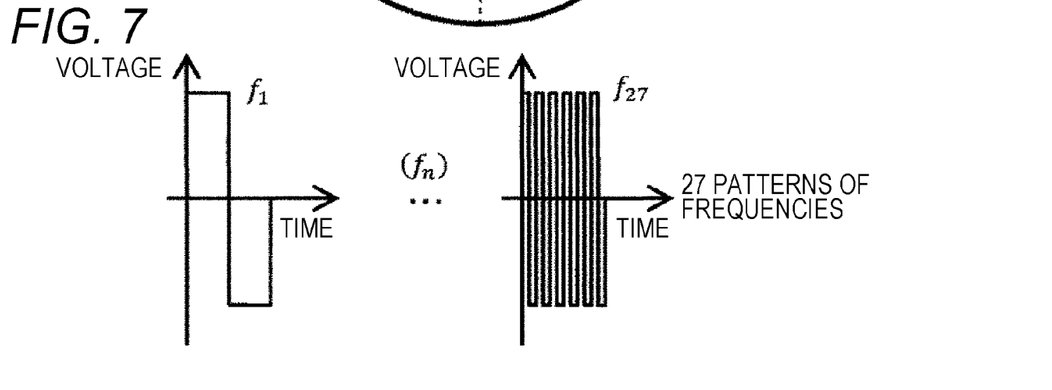
FIG. 7 is a diagram illustrating frequency modulation as an exemplary modulation method used in the modulation circuit and the demodulation circuit.
Figure 8:
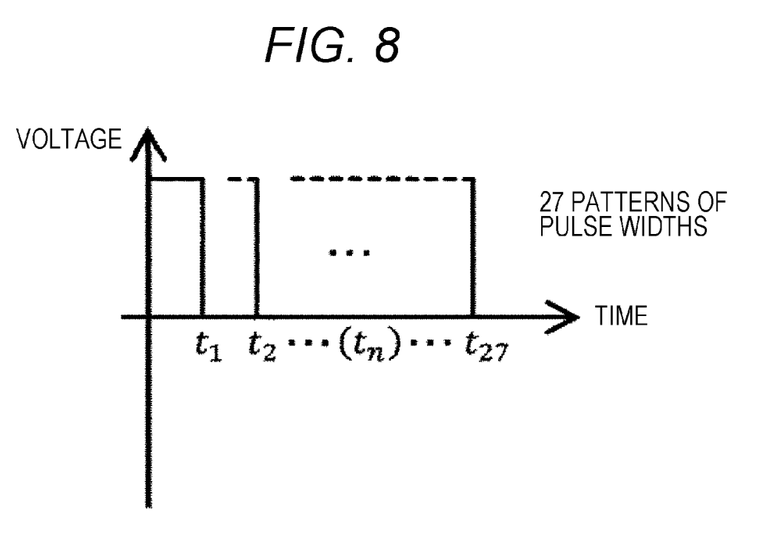
FIG. 8 is a diagram illustrating pulse width modulation as an exemplary modulation method used in the modulation circuit and the demodulation circuit.

FIGS. 5 to 8 are diagrams illustrating exemplary modulation methods used in the modulation circuit and the demodulation circuit, in which FIG. 5 illustrates an example of amplitude modulation, FIG. 6 an example of phase modulation, FIG. 7 an example of frequency modulation, and FIG. 8 an example of pulse width modulation, respectively.

As illustrated in FIG. 5, in a case of modulating a control signal as a change (difference) in signal amplitude, a modulation signal is generated (that is, the control signal is converted to a modulation signal) by changing the content of the control signal (which one of combinations) to conform to voltage magnitude (any one of 27 combinations of voltage magnitude). Additionally, as illustrated in FIG. 6, in a case of modulating the control signal as a change (difference) in a signal phase, a modulation signal is generated (that is, the control signal is converted to a modulation signal) by changing the content of the control signal (which one of combinations) to conform to a phase (any one of 27 combinations of phases). Furthermore, as illustrated in FIG. 7, in a case of modulating a control signal as a change (difference) in a signal frequency, a modulation signal is generated (that is, the control signal is converted to a modulation signal) by changing the content of the control signal (which one of combinations) to conform to a frequency (any one of 27 combinations of frequencies), and additionally, as illustrated in FIG. 8, in a case of modulating a control signal as a change (difference) in a pulse width, a modulation signal is generated (that is, the control signal is converted to a modulation signal) by changing the content of the control signal (which one of combinations) to conform to a pulse width (any one of 27 combinations of pulse widths (may be duty ratios)). Then, the modulation circuit 7 superimposes the modulation signal generated on the basis of any one of the methods of FIGS. 5 to 8 on a carrier wave, and outputs the same to the signal line 8.

The effects of the present embodiment thus configured will be described.

In the prior art, in a case of controlling an N-phase electric motor (rotating electric machine), the number of terminals of a control circuit, the number of drive circuit terminals to drive the electric motor, and the number of wires connecting these terminals are required to be same as the number of the phases (N) of the electric motor. Therefore, considering redundancy of a wire to prevent a risk of wire disconnection, short circuit, and the like, the number of terminals and the number of wires are largely increased, and therefore, the related art is not sufficient to miniaturize the drive control device for an electric motor.

On the other hand, in the present embodiment, the drive circuit 3 that drives the electric motor 120 having a plurality of phases (e.g., three phases) and the control circuit 2 that outputs a control signal to control the drive circuit 3 are provided, and the number of signal lines 8 that connects the control circuit 2 to the drive circuit 3 to transmit the control signal from the control circuit 2 to the drive circuit 3 is the number (one signal line) fewer than the number of the phases (three phases) of the electric motor 120, and therefore, miniaturization can be achieved by reducing the number of terminals and the number of wires.

In other words, since the modulation circuit 7 that modulates a control signal to control each of the plurality of H-side drivers and the plurality of L-side drivers and outputs the same to the signal line 8 is provided in the control circuit 2, and also the demodulation circuit 9 that demodulates the control signal transmitted via the signal line 8 and outputs the same to the plurality of H-side drivers and the plurality of L-side drivers is provided, the number of signal lines 8 can be reduced to the number (one signal line) fewer than the number of the phases (three phases) of the electric motor 120, and miniaturization can be achieved by reducing the number of terminals and the number of wires.

Meanwhile, the modulation circuit 7 is provided in the control circuit 2 in the present embodiment, but not limited thereto, any arbitrary modulation system may be incorporated inside the microcomputer 6 or an externally-attached modulation circuit that executes modulation other than the above-described modulation methods (voltage, phase, frequency, pulse width) may also be used.

Second Embodiment

A second embodiment will be described with reference to FIG. 9.

The present embodiment illustrates a case of including an abnormality detecting function for a control signal transmitted through a signal line in a first embodiment.

Figure 9:
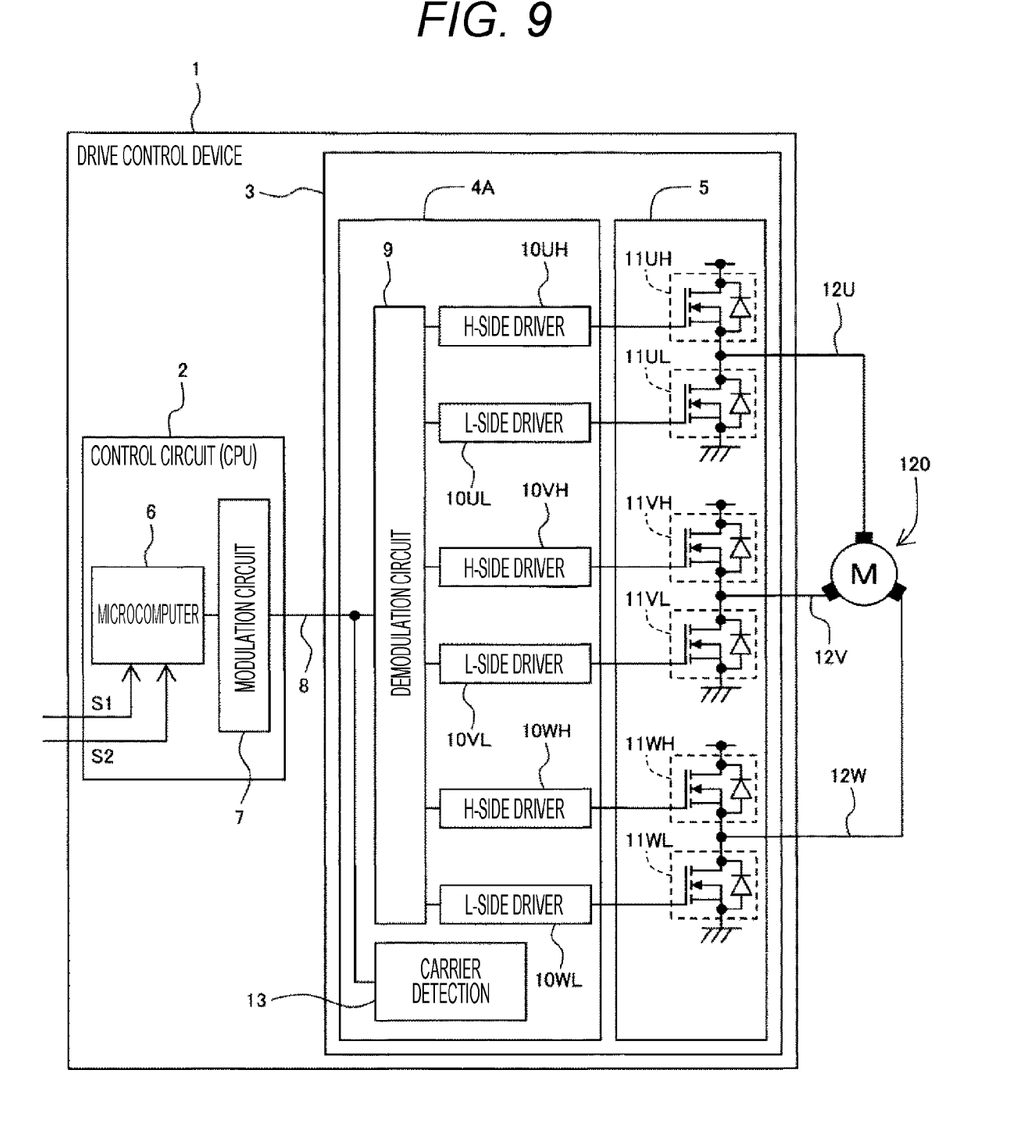
FIG. 9 is a diagram schematically illustrating an entire configuration of a drive control device for an electric motor according to a second embodiment.

FIG. 9 is a diagram schematically illustrating an entire configuration of a drive control device for an electric motor according to the present embodiment. In the drawing, a member similar to the first embodiment will be denoted by the same reference sign and a description thereof will be omitted.

In FIG. 9, a drive control device 1 includes: a control circuit (CPU) 2 that generates a control signal used to control an electric motor 120 on the basis of a steering torque detection signal S1 and a vehicle speed signal S2; and a drive circuit 3 that drives the electric motor 120 on the basis of the control signal transmitted from the control circuit 2 via a signal line 8.

The drive circuit 3 includes: an inverter circuit 5 that drives the electric motor 120 connected via a U-phase wire 12U, a V-phase wire 12V, and a W-phase wire 12W connected to the electric motor 120; and an inverter drive circuit (pre-driver IC) 4A that outputs a drive signal (gate signal) to drive the inverter circuit 5.

The inverter drive circuit 4A includes: a demodulation circuit 9 that demodulates (restores) the control signal (modulation signal superimposed on a carrier wave) transmitted via the signal line 8; H-side drivers 10UH, 10VH, and 10VW each of which outputs a drive signal gate signal) to perform on/off drive (conduction/interruption) for each of the H-side switching elements 11UH, 11VH, and 11WH of the inverter circuit 5 on the basis of the control signal demodulated by the demodulation circuit 9; L-side drivers 10UL, 10VL, and 10WL each of which outputs a drive signal (gate signal) to perform on/off drive (conduction/interruption) for each of the L-side switching elements 11UL, 11VL, and 11WL on the basis of the demodulated control signal; and a carrier detection unit 13 that detects a carrier of the control signal transmitted through the signal line 8 (carrier wave detection).

The carrier detection unit 13 implements the abnormality detecting function by detecting a carrier (carrier wave) transmitted through the signal line 8 and detecting presence and an abnormality of the carrier wave. An abnormality detection result is transmitted to the H-side drivers 10UH, 10VH, 10WH, the L-side drivers 10UL, 10VL, 10WL, the control circuit 2, and a higher-order control device, and used as information to execute appropriate control.

Other configurations are the same as in the first embodiment.

Effects similar to those in the first embodiment can be obtained also in the present embodiment configured as described above.

Additionally, in the prior art, to incorporate an abnormal signal detecting function in a signal line between a control circuit and a drive circuit, the abnormal signal detecting function is required to be incorporated in each of the number of signal lines equal to or larger than the number of the phases of an electric motor, however; in the present embodiment, it is only to incorporate an abnormal signal detecting function between the control circuit 2 and the drive circuit 3 in the number of the signal lines 8 (one signal line) fewer than the number of the phases (three phases) of the electric motor 120, and the area of the circuits can be reduced.

Third Embodiment

A third embodiment of the present invention will be described with reference to FIG. 10.

The present embodiment illustrates a case of including an error detecting function for a control signal transmitted via a signal line of a first embodiment.

Figure 10:
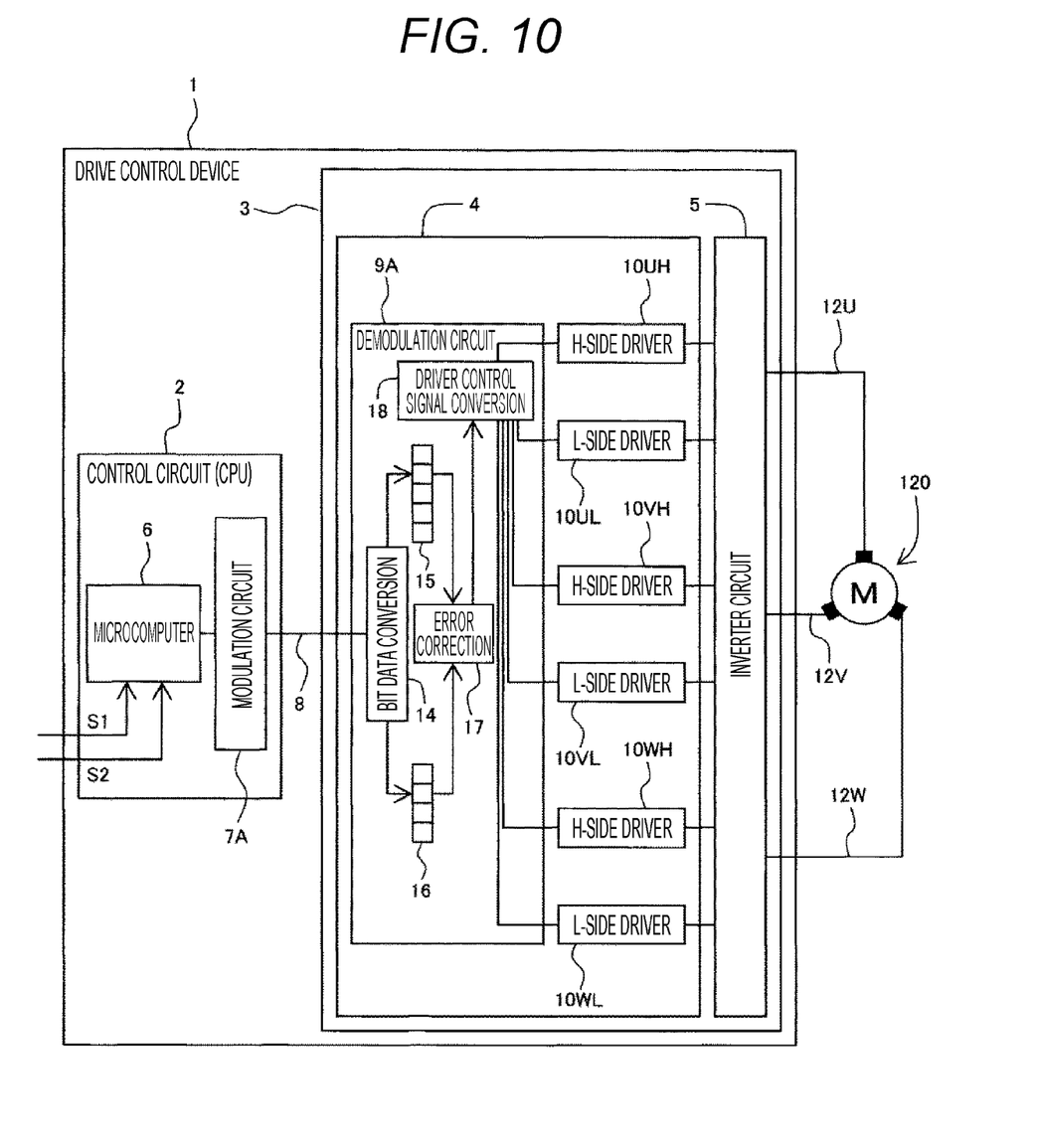
FIG. 10 is a diagram schematically illustrating an entire configuration of a drive control device for an electric motor according to a third embodiment.

FIG. 10 is a diagram schematically illustrating an entire configuration of a drive control device for an electric motor according to the present embodiment. In the drawing, a member similar to the first embodiment will be denoted by the same reference sign and a description thereof will be omitted.

In FIG. 10, a drive control device 1 includes: a control circuit (CPU) 2 that generates a control signal used to control an electric motor 120 on the basis of a steering torque detection signal S1 and a vehicle speed signal S2; and a drive circuit 3 that drives the electric motor 120 on the basis of a control signal transmitted from the control circuit 2 via a signal line 8.

The control circuit 2 includes: a microcomputer 6 that generates a control signal used to control the electric motor 120 on the basis of the steering torque detection signal S1 and the vehicle speed signal S2; a modulation circuit 7A that generates a modulation signal by modulating (converting) the control signal generated by the microcomputer 6 and outputs the same to the signal line 8 in a manner superimposed on a carrier wave.

The drive circuit 3 includes: an inverter circuit 5 that drives the electric motor 120 connected via a U-phase wire 12U, a V-phase wire 12V, and a W-phase wire 12W connected to the electric motor 120; and an inverter drive circuit (pre-driver IC) 4 that outputs a drive signal (gate signal) to drive the inverter circuit 5.

The inverter drive circuit 4 includes: a demodulation circuit 9A that demodulates (restores) the control signal (modulation signal superimposed on the carrier wave) transmitted through the signal line 8; H-side drivers 10UH, 10VH, and 10VW each of which outputs a drive signal (gate signal) to perform on/off drive (conduction/interruption) for each of H-side switching elements 11UH, 11VH, and 11WH of the inverter circuit 5 on the basis of the control signal demodulated by the demodulation circuit 9A; and L-side drivers 10UL, 10VL, and 10WL each of which outputs a drive signal (gate signal) to perform on/off drive (conduction/interruption) for each of L-side switching elements 11UL, 11VL, and 11WL on the basis of the demodulated control signal.

The modulation circuit 7A generates not only the control signal generated by the microcomputer 6 but also a modulation signal by modulating (converting) information for error detection/correction. For example, assuming that the number of patterns of control signals of the electric motor 120 is 27, a data amount becomes 5 bits in a case of converting the information into bit data. In a case of using a Hamming code in error correction, 4 bits are required as a redundant bit data amount for error correction relative to the 5-bit information, and therefore, 16 patterns of signals obtained by modulating the redundant bit data are generated as modulation signals similar to modulation (conversion) of the control information. Then, the modulation signal for control and the modulation signal for error detection/correction are alternately transmitted to the signal line 8.

The demodulation circuit 9A includes a bit data conversion unit 14 that converts the control signal transmitted from the signal line 8 into bit data; a latch circuit 15 that holds data included in the bit data converted by the bit data conversion unit 14 and corresponding to a modulation signal for control; a latch circuit 16 that holds data for error detection/correction included in the bit data converted by the bit data conversion unit 14; an error correction unit 17 that detects/corrects data on the basis of the bit data held in each of the latch circuits 15 and 16; and a driver control signal conversion unit 18 that converts a control signal from the error correction unit 17 into control signals of the H-side drivers 10UH, 10VH, 10VW and the L-side drivers 10UL, 10VL, 10WL.

Other configurations are the same as in the first embodiment.

Effects similar to those in the first embodiment can be obtained also in the present embodiment configured as described above.

Additionally, since the control circuit 2 and the drive circuit 3 are connected by the number of signal lines 8 (one signal line) fewer than the number of the phases (three phases) of the electric motor 120, an increased amount in the number of wires due to redundancy can be suppressed.

Fourth Embodiment

A fourth embodiment of the present invention will be described with reference to FIG. 11.

The present embodiment illustrates a case where an inverter circuit and the like in a first embodiment are made redundant.

Figure 11:
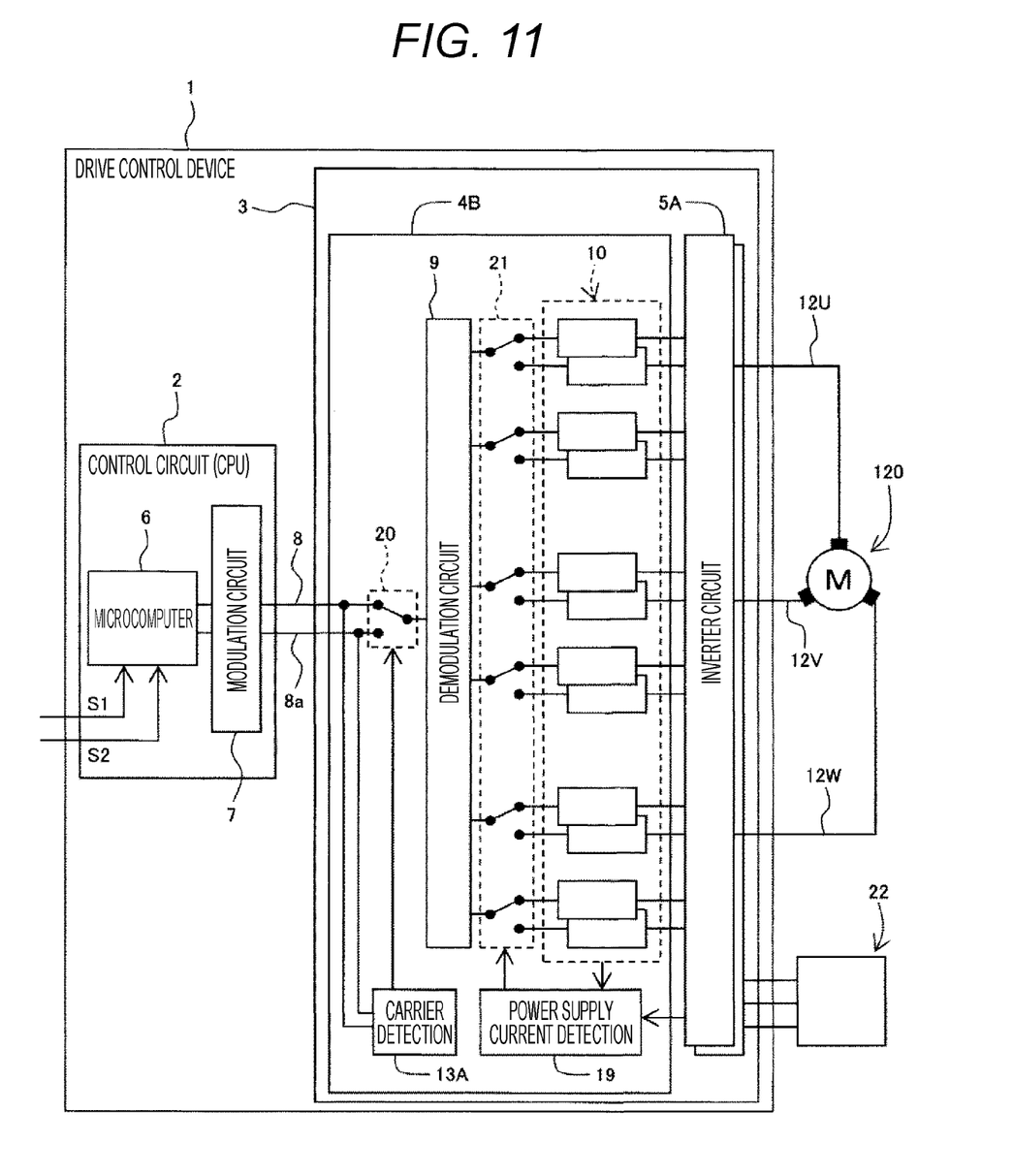
FIG. 11 is a diagram schematically illustrating an entire configuration of a drive control device for an electric motor according to a fourth embodiment.

FIG. 11 is a diagram schematically illustrating an entire configuration of a drive control device for an electric motor according to the present embodiment. In the drawing, a member similar to the first embodiment will be denoted by the same reference sign and a description thereof will be omitted.

In FIG. 11, a drive control device 1 includes: a control circuit (CPU) 2 that generates a control signal used to control an electric motor 120 on the basis of a steering torque detection signal S1 and a vehicle speed signal S2; and a drive circuit 3 that drives the electric motor 120 on the basis of control signals transmitted from the control circuit 2 via a plurality of signal lines 8 and 8a redundantly configured.

The drive circuit 3 includes: a plurality of inverter circuits 5A that drives the electric motor 120 connected via a U-phase wire 12U, a V-phase wire 12V, and a W-phase wire 12W connected to the electric motor 120 and further enables output 22 of a drive signal to another driving target; and an inverter drive circuit (pre-driver IC) 4B that outputs a drive signal (gate signal) to drive each of a plurality of inverter circuits 5A. In the plurality of inverter circuits 5A, the inverter circuits having the same configuration are used in parallel. Note that the output 22 is used in a case of driving the electric motor 120 by being switched from the phase wires 12U, 12V, and 12W of the respective phases adapted to drive the electric motor 120, in a case of driving another electric motor redundantly configured, or in a case of providing a redundant phase in the electric motor 120 and driving the redundant phase.

The inverter driving circuit 4B includes: a carrier detection unit 13A that detects a carrier of a control signal transmitted through the signal lines 8 and 8a (carrier wave detection); a switching unit 20 that selectively switches, on the basis of a detection result of the carrier detection unit 13A, a control signal to be received in a demodulation circuit 9 among the control signals transmitted through the signal lines 8 and 8a; the demodulation circuit 9 that demodulates (restores) the control signal (modulation signal superimposed on a carrier wave) transmitted through a signal line selected by the switching unit 20 from among the signal lines 8 and 8a; a driver group 10 redundantly configured by a plurality of H-side drivers and a plurality of L-side drivers each of which outputs a drive signal (gate signal) to each of the plurality of inverter circuits 5A configured in a superimposed manner on the basis of the control signal demodulated by the demodulation circuit 9; a power supply current detection unit 19 that detects current flowing through each of the drivers of the driver group and detects an abnormality of the driver group 10; and a switching unit 21 that switches, on the basis of a detection result for the driver group 10, a driver to which the signal demodulated by the demodulation circuit 9 is to be output among the drivers constituting the driver group 10. In the driver group 10, driver groups having the same configuration are used in parallel corresponding to respective inverter circuits constituting the plurality of inverter circuits 5A.

The carrier detection unit 13A implements an abnormality detecting function by detecting a carrier (carrier wave) transmitted through the signal lines 8 and 8a and detecting presence and an abnormality of the carrier wave. By outputting an abnormality detection result to the switching unit 20, the switching unit 20 selects, from among the signal lines 8 and 8a, a signal line through which the control signal is transmitted without any abnormality, and can output the control signal transmitted through the selected signal line to the demodulation circuit 9.

The power supply current detection unit 19 detects an abnormality of each driver by detecting current flowing through each driver or the like in the driver group 10 and outputs a detection result to the switching unit 21, thereby enabling the switching unit 21 to select a driver group being operated without any abnormality, and perform switching to a selected driver group and a selected inverter circuit.

Other configurations are the same as in the first embodiment.

Effects similar to those in the first embodiment can be obtained also in the present embodiment configured as described above.

Additionally, since there is no need to make the demodulation circuit 9 redundant, increase in the circuit area due to redundancy can be suppressed. Additionally, since the control circuit 2 and the drive circuit 3 are connected by the number of signal lines 8 and 8a (two signal lines) fewer than the number of the phases (three phases) of the electric motor 120, an increased amount in the number of wires due to redundancy can be suppressed.

Fifth Embodiment

A fifth embodiment of the present invention will be described with reference to FIG. 12.

The present embodiment illustrates a case where a drive circuit in a first embodiment is made redundant.

Figure 12:
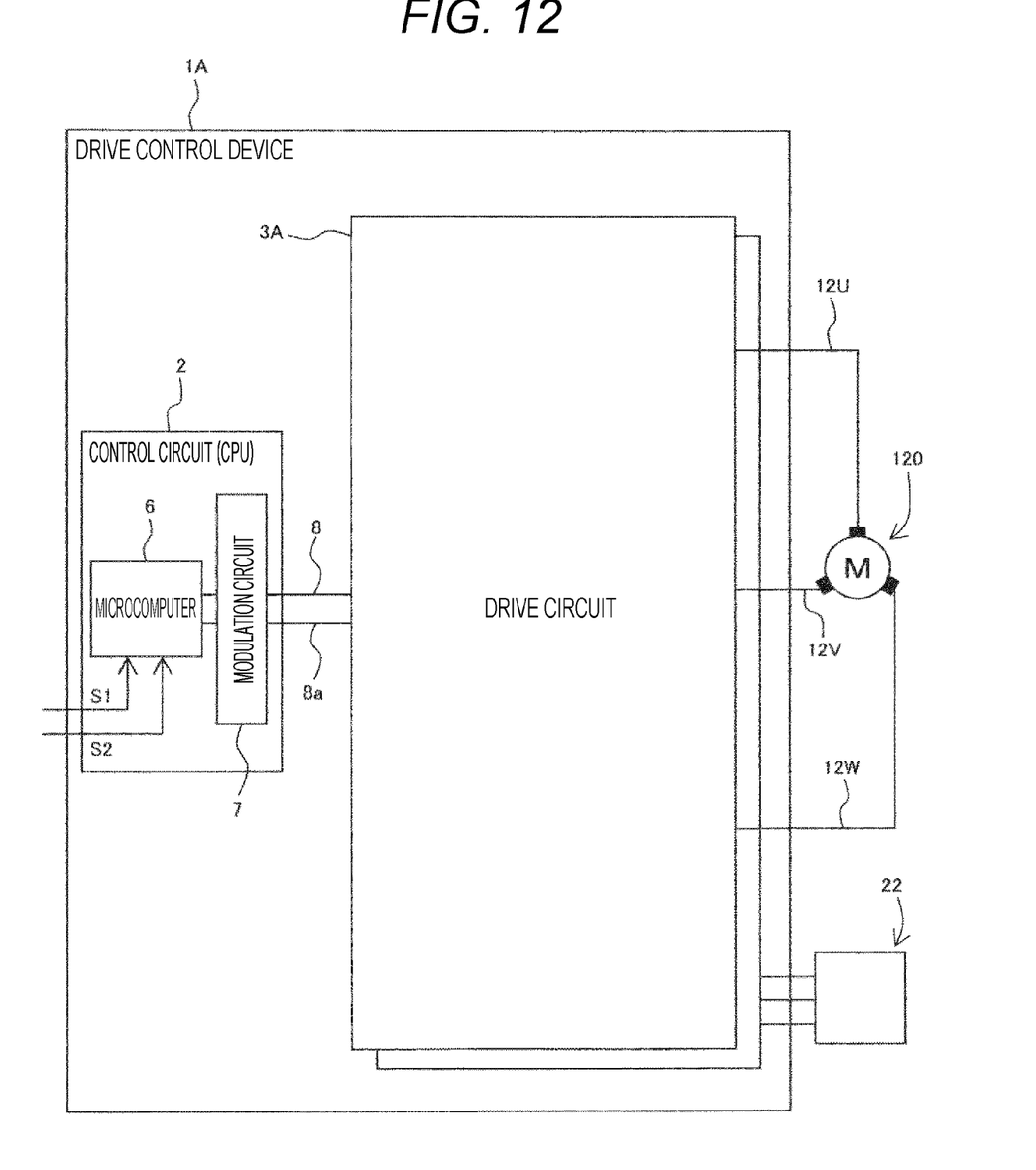
FIG. 12 is a diagram schematically illustrating an entire configuration of a drive control device for an electric motor according to a fifth embodiment.

FIG. 12 is a diagram schematically illustrating an entire configuration of a drive control device for an electric motor according to the present embodiment. In the drawing, a member similar to the first embodiment will be denoted by the same reference sign and a description thereof will be omitted.

In FIG. 12, a drive control device 1A includes: a control circuit (CPU) 2 that generates a control signal used to control an electric motor 120 on the basis of a steering torque detection signal S1 and a vehicle speed signal S2; and a plurality of drive circuits 3A that drives the electric motor 120 on the basis of control signals transmitted from the control circuit 2 via a plurality of signal lines 8 and 8a redundantly configured, and also is redundantly configured to enable output 22 of a drive signal to another driving target.

Other configurations are the same as in the first embodiment.

Effects similar to those in the first embodiment can be obtained also in the present embodiment configured as described above.

Additionally, since the control circuit 2 and the drive circuit 3 are connected by the number of signal lines 8 and 8a (two signal lines) fewer than the number of the phases (three phases) of the electric motor 120, an increased amount in the number of wires due to redundancy can be suppressed.

Sixth Embodiment

A sixth embodiment of the present invention will be described with reference to FIG. 13.

The present embodiment illustrates a case where a control signal on which a plurality of control signals is superimposed is transmitted through a signal line 8 in a first embodiment.

Figure 13:
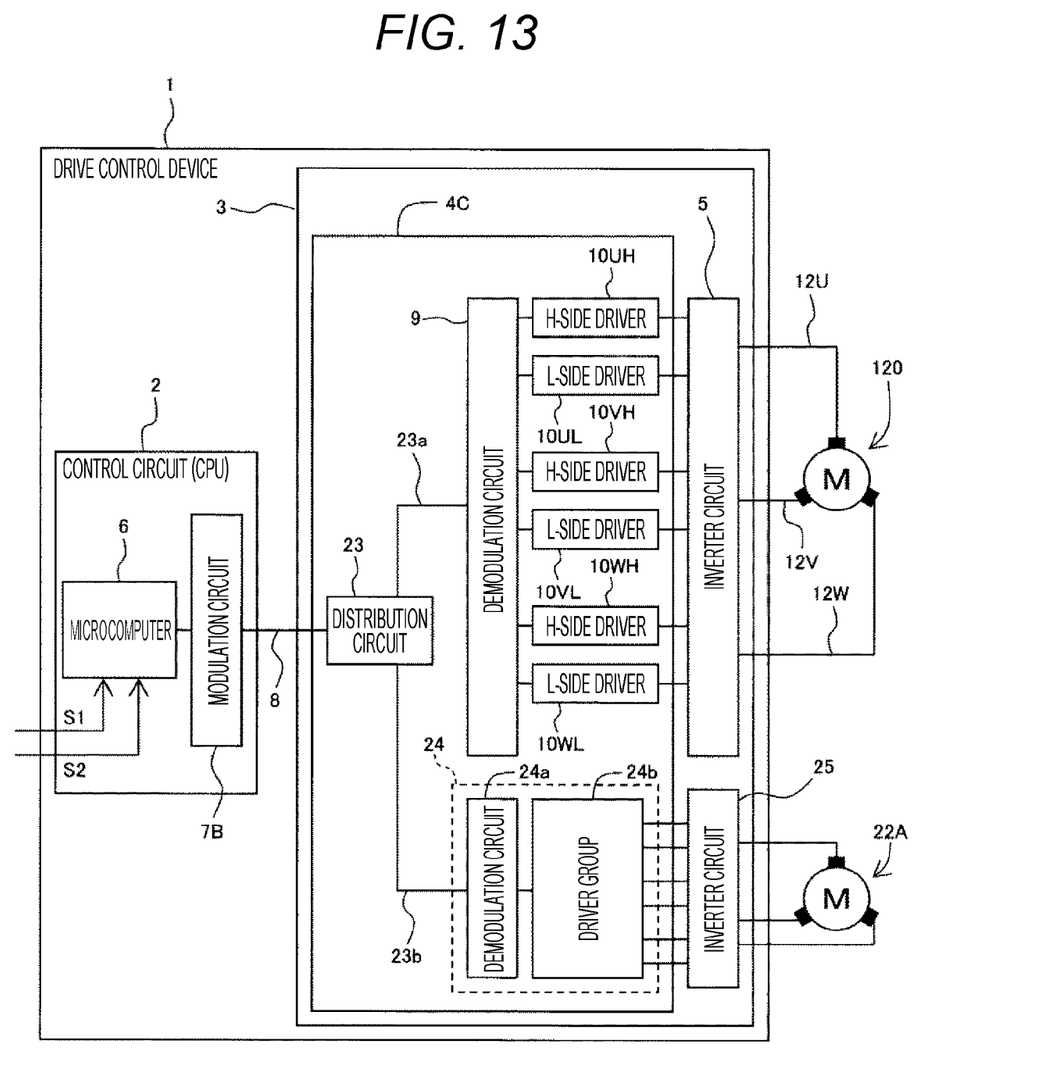
FIG. 13 is a diagram schematically illustrating an entire configuration of a drive control device for an electric motor according to a sixth embodiment.

FIG. 13 is a diagram schematically illustrating an entire configuration of a drive control device for an electric motor according to the present embodiment. In the drawing, a member similar to the first embodiment will be denoted by the same reference sign and a description thereof will be omitted.

In 13, a drive control device 1 includes: a control circuit (CPU) 2 that generates a control signal used to control an electric motor 120 on the basis of a steering torque detection signal S1 and a vehicle speed signal S2; and a drive circuit 3 that drives the electric motor 120 on the basis of a control signal transmitted from the control circuit 2 via a signal line 8.

The control circuit 2 includes: a microcomputer 6 that generates a control signal used to control the electric motor 120 on the basis of the steering torque detection signal S1 and the vehicle speed signal S2; a modulation circuit 7B that generates a modulation signal by modulating (converting) the control signal generated by the microcomputer 6 and outputs the generated modulation signal to the signal line 8 in a manner superimposed on a carrier wave.

The drive circuit 3 includes: an inverter circuit 5 that drives the electric motor 120 connected via a U-phase wire 12U, a V-phase wire 12V, and a W-phase wire 12W connected to the electric motor 120; an inverter circuit 25 that drives another electric motor 22A; and an inverter drive circuit (pre-driver IC) 4C that outputs drive signals (gate signals) to drive the inverter circuits 5 and 25.

The inverter drive circuit 4C includes: a distribution circuit 23 that distributes a control signal transmitted via the signal line 8 into a control signal 23a that is a high frequency component and a control signal 23b that is a low frequency component; a demodulation circuit 9 that demodulates (restores) a control signal transmitted as the control signal 23a (modulation signal superimposed on a carrier wave); H-side drivers 10UH, 10VH, and 10VW each of which outputs a drive signal (gate signal) to perform on/off drive (conduction/interruption) for each of H-side switching elements (11UH, 11VH, and 11WH) of the inverter circuit 5 on the basis of the control signal demodulated by the demodulation circuit 9; L-side drivers 10UL, 10VL, and 10WL each of which outputs the drive signal (gate signal) to perform on/off drive (conduction/interruption) for each of L-side switching elements (11UL, 11VL, and 11WL) on the basis of the demodulated control signal; and a lower frequency drive circuit 24 that drives a drive control target (electric motor) 22A on the basis of the control signal transmitted as the control signal 23b.

The modulation circuit 7B outputs, to the signal line 8, not only a modulation signal obtained by modulating the control signal of the electric motor 120 generated by the microcomputer 6 but also a control signal for the drive control target 22A in a manner further superimposed as a modulation signal control signal for another frequency band. Note that a description will be provided here assuming that the control signal of the electric motor 120 is in a high frequency band and the control signal of the drive control target 22A is in a low frequency band.

The distribution circuit 23 has a function to distribute signals for each frequency (functions as a separator and a splitter) and outputs, from the signal transmitted through the signal line 8: the control signal 23a in a certain frequency band (e.g., high frequency band) to the demodulation circuit 9; and the control signal 23b in another frequency band (e.g., low frequency band) to a demodulation circuit 24a.

The low frequency drive circuit 24 includes: the demodulation circuit 24a that demodulates (restores) a control signal (modulation signal superimposed on a carrier wave) transmitted as the control signal 23b; and a driver group 24b that outputs, on the basis of the control signal demodulated by the demodulation circuit 24a, a drive signal (gate signal) to perform on/off drive (conduction/interruption) for each of H-side and L-side switching elements of the inverter circuit 25. The low frequency drive circuit 24 is driven by a drive signal in a frequency band different from that of the electric motor 120, and for example, is driven by a drive signal in a frequency band lower than that of the electric motor 120, for example.

Other configurations are the same as in the first embodiment.

Effects similar to those in the first embodiment can be obtained also in the present embodiment configured as described above.

Additionally, it is possible to control, at the same time with the electric motor 120, the low frequency drive circuit 24 that can be driven by a control signal (low frequency signal) in a frequency band different from that of a main driving target (such as the electric motor 120).

Meanwhile, in the present embodiment, the electric motor 22A is described as an example of the drive control target of the low frequency drive circuit 24, but not limited thereto, a different drive control target may be driven by outputting a control signal to the low frequency drive circuit that drives the different drive control target.

Additionally, note that the present invention is not limited to the above-described embodiments and may include various modified examples. For example, the above examples are described in detail for easy understanding of the present invention and the present invention is not necessarily limited to those having all of the above-described configurations. Furthermore, each of the above-described configurations, functions, and the like may be implemented by designing a part or all thereof with an integrated circuit, for example. Additionally, each of the above-described configurations, functions, and the like may be implemented using software by a processor interpreting and executing a program that implements the respective functions.

Reference Signs List 1 drive control device
2 control circuit (CPU)
3, 3A drive circuit
4, 4A, 4B, 4C inverter drive circuit (pre-driver IC)
5, 5A inverter circuit
6 microcomputer
7, 7A, 7B modulation circuit
8, 8a signal line
9, 9A demodulation circuit
10 driver group
10UH, 10VH, 10WH H-side driver (switching element driver)
10UL, 10VL, 10WL L-side driver (switching element driver)
11UH, 11VH, 11WH H-side switching element
11UL, 11VL, 11WL L-side switching element
12U U-phase wire
12V V-phase wire
12W W-phase wire
13, 13A carrier detection unit
14 bit data conversion unit
15, 16 latch circuit
17 error correction unit
18 driver control signal conversion unit
19 power supply current detection unit
20, 21 switching unit 22 output
22A drive control target (electric motor)
23 distribution circuit
23a, 23b control signal
24 low frequency drive circuit
24a demodulation circuit
24b driver group
25 inverter circuit
100 steering wheel
110 steering torque sensor
120 electric motor
140 steering shaft
150 electric power steering device
160 decelerator
170 pinion gear
180 rack shaft
200 wheel

The invention claimed is:

1. A drive control device for an electric motor, comprising:
    a drive circuit configured to drive an electric motor having a plurality of phases;
    a control circuit configured to output a control signal to control the drive circuit;
    a signal line that connects the control circuit to the drive circuit to transmit a control signal from the control circuit to the drive circuit, the number of the signal lines being fewer than the number of the phases of the electric motor;
    a plurality of switching element drivers constituting pairs each of which formed of an H-side driver that drives an H-side switching element arranged on a high potential side and an L-side driver that drives an L-side switching element arranged on a low potential side of power supply of a plurality of pairs of switching elements provided in the drive circuit in a manner corresponding to the respective phases of the electric motor;
    a modulation circuit provided in the control circuit and configured to modulate a control signal in order to control each of the plurality of switching element drivers, and configured output the modulated control signal to the signal line; and
    a demodulation circuit provided in the drive circuit and configured to demodulate the control signal transmitted via the signal line and output the demodulated control signal to the plurality of switching element drivers.

2. The drive control device for an electric motor according to claim 1, wherein the modulation circuit modulates the control signal by amplitude modulation, phase modulation, frequency modulation, or pulse width modulation.

3. The drive control device for an electric motor according to claim 1, wherein the drive circuit includes an abnormality signal detection unit configured to detect a communication abnormality on the basis of a carrier signal transmitted through the signal line.

4. The drive control device for an electric motor according to claim 1, further comprising at least one redundant signal line connected in parallel to the signal line so as to transmit the control signal from the control circuit,
    wherein the drive circuit includes:
        a signal line switching unit configured to switch, between a plurality of signal lines including the signal line and the redundant signal line, a signal line to be connected to the modulation circuit; and
        an abnormality detection unit configured to detect a communication abnormality on the basis of a carrier signal transmitted through the signal line and control the signal line switching unit on the basis of a detection result.

5. The drive control device for an electric motor according to claim 1, wherein the demodulation circuit includes:
    a bit data conversion unit configured to convert a control signal transmitted through the signal line into bit data; and
    an error detection unit configured to detect an error of a control signal on the basis of the bit data.

6. The drive control device for an electric motor according to claim 1, further comprising at least one redundant switching element driver connected in parallel to each of the plurality of switching element drivers so as to transmit the control signal from the modulation circuit,
    wherein the drive circuit includes:
        a driver switching unit configured to switch, between a plurality of switching element drivers including the switching element drivers and the redundant switching element driver, a switching element driver to which the control signal from the demodulation circuit is to be transmitted; and
        a current detection unit configured to detect consumption current of the plurality of switching element drivers and control the driver switching unit on the basis of a detection result.

7. The drive control device for an electric motor according to claim 1, wherein the drive circuit includes a distribution circuit configured to distribute, on the basis of a frequency component, a control signal received in the demodulation circuit via the signal line into a first control signal to drive the electric motor and a second control signal to drive another electric motor.

* * * * *